Patented Dec. 8, 1925.

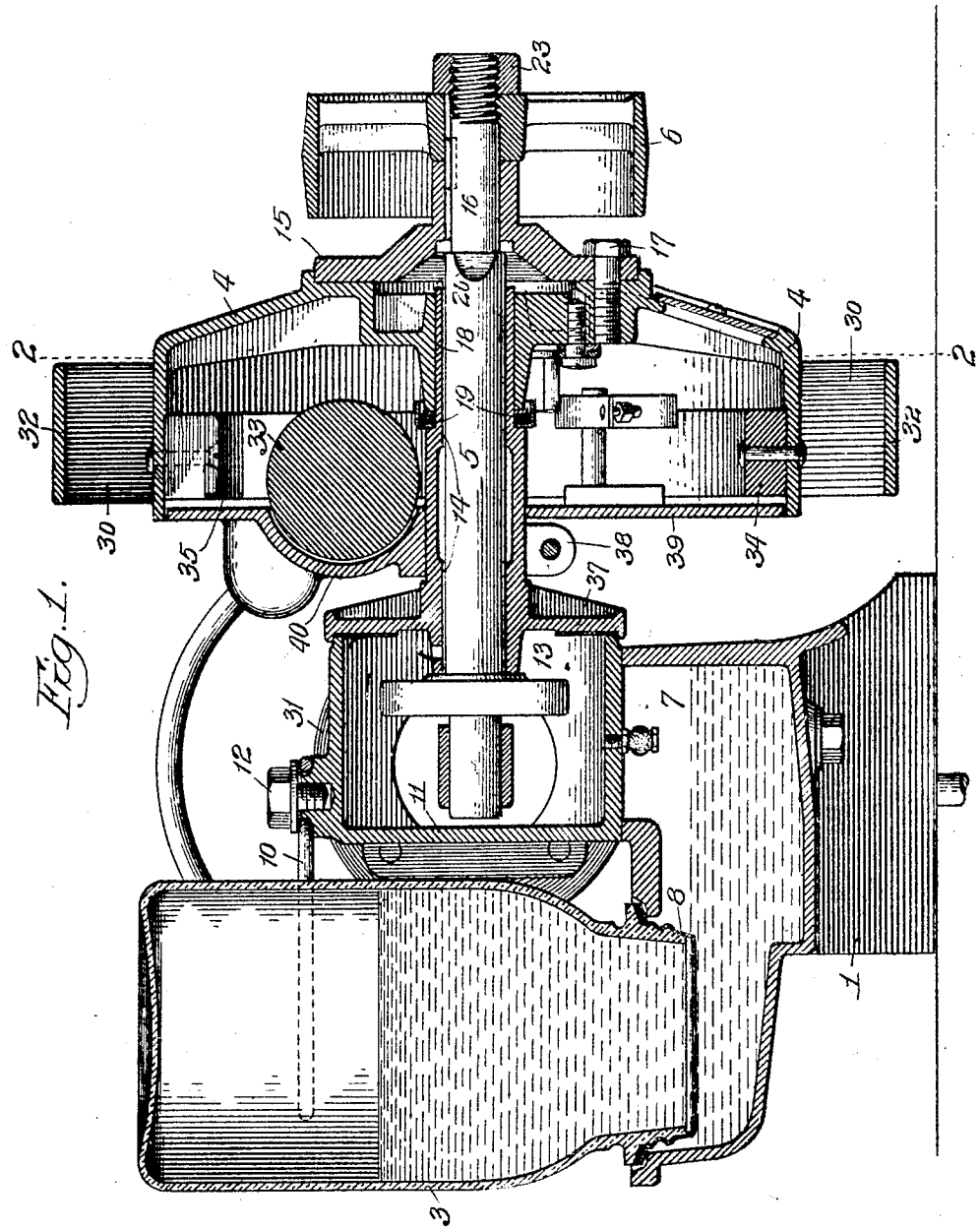

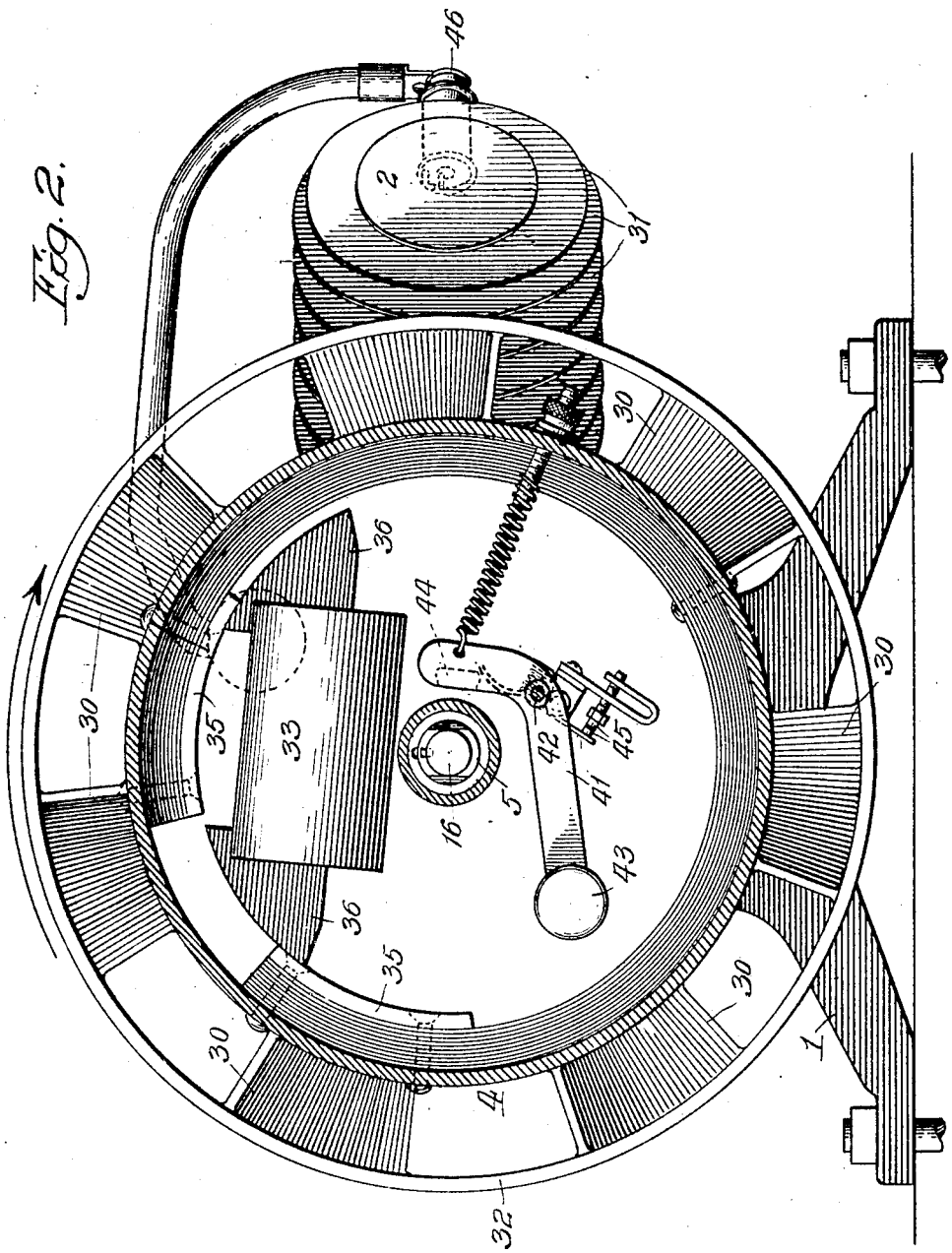

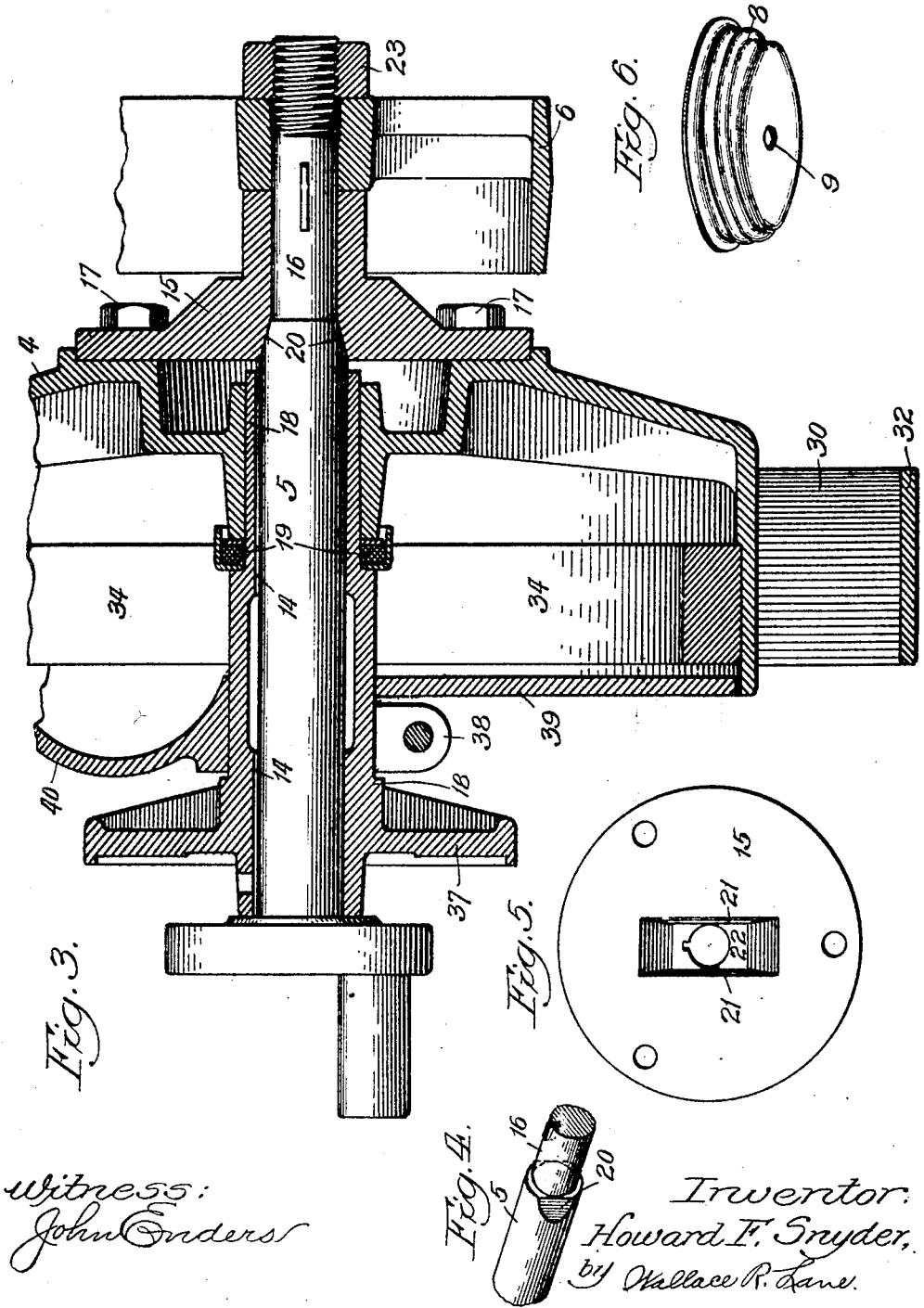

1,565,110

UNITED STATES PATENT OFFICE.

HOWARD F. SNYDER, OF NEWTON, IOWA, ASSIGNOR TO THE MAYTAG COMPANY, OF NEWTON, IOWA, A CORPORATION OF IOWA.

INTERNAL-COMBUSTION ENGINE.

Application filed October 26, 1921. Serial No. 510,458.

*To all whom it may concern:*

Be it known that I, HOWARD F. SNYDER, a citizen of the United States, residing at Newton, Iowa, have invented certain new and useful Improvements in Internal-Combustion Engines, of which the following is a specification.

This invention relates to a new self-contained power generating unit in the form of two cycle, air-cooled internal combustion engine, and among the objects of this invention are to provide a light, complete self-contained power plant, suitable for use where power is to be used about the household, and wherever a light, portable power plant is needed; to provide a power plant having its fuel supply in full view of the operator; to provide a power plant having automatic lubricating system; to provide a power plant having its parts readily accessible; to provide a power plant so arranged that its fly wheel may be instantly removed or attached to a crank shaft without the use of keys or pins and without the necessity of using considerable force to press the fly wheel into place on the shaft; to provide a power plant having its cooling fan so constructed that the air cannot be thrown by centrifugal force from the ends of the fan blades, but must pass through the fan wheel towards the cylinder; to provide a motor of the class indicated having its crank bearings so arranged as to avoid the necessity for using thick grease or packing to hold the compression in the crank case; to provide a fan wheel arranged to carry a spark generating magnet so that the magnet ring will act as a power distributing element in place of the usual fly wheel or balance wheel; to provide an engine having its fuel supply automatically maintained at constant level without the use of float or valves; and such further objects, advantages and capabilities as will later more fully appear.

My invention further resides in the combination, construction and arrangement of parts illustrated, and while I have shown herein a preferred embodiment, I desire the same to be understood as illustrative only, and not as limiting my invention.

In the drawings, annexed hereto and forming a part hereof, Fig. 1, is a transverse, vertical, medial section of a preferred form of my invention. Fig. 2 is a section at right angles to Fig. 1, substantially along the plane indicated by the line 2—2 in said figure. Fig. 3 is an enlarged fragmentary vertical section similar to Fig. 1, showing in greater detail parts of my construction. Fig. 4 is a broken perspective view of the crankshaft showing certain details of construction. Fig. 5 is an internal face view of the cap plate which closes one side of the fan wheel. Fig. 6 is a perspective view of the cap which acts as a closure means for the fuel container.

Referring more in detail to the annexed drawings, numeral 1 designates the base, which supports the engine and by means of which the same is secured to any convenient mounting, 2 designates the engine cylinder, 3 the detachable fuel container, 4 the fan wheel, 5 the crankshaft, and 6 the belt wheel or analogous device by means of which the power is taken from the crank shaft. In the base of the engine is a fuel reservoir 7, into which fits the lower end of the detachable reservoir 3, which has secured thereto a feeding means 8, perforated at 9 as shown in Fig. 6. Spring means 10, in the form of a pair of spring arms, held in place on the crank case 11 by a bolt 12, holds the fuel container 3 in place on the engine, irrespective of the jolts due to the running thereof.

The lubricating oil is mixed with the fuel oil in container 3, and gradually feeds therefrom into reservoir 7, from which it passes to the carburetor, and finally into the crank case 13, finding its way along crankshaft 5 as at 14. The oil and gas may gradually work their way along this shaft into the space between the fan wheel 4, and the coverplate 15 which surrounds and fits closely the reduced end 16 of the crank shaft, but it will be kept from escape between the fan wheel 4 and the cover or drain plate 15, by reason of the fact that the latter is secured to the former very closely by means of bolts 17 and will further be kept from escape between fan wheel 4 and bearing member 18 by a gasket or gaskets 19. This permits thorough lubrication of the bearing, without objectionable dripping of the oil therefrom or loss of compression due to loose fitting parts. This construction also prevents the loss of compression in the crank case due to escaping gas. The crank shaft is bevelled, as shown at 20, to fit co-operating faces, 21, of a slot 22 formed in the inner side in the cover plate 15. After the cover plate 15 has been put in position and secured by means of the bolt 17, belt wheel 6 is placed on the reduced portion 16 of the crank shaft and a nut 23 is put on to hold the same in place. Tightening up this nut 23 draws the co-operating faces 20 and 21 into close engagement and permits a tight joint to be formed so that there shall be no play between the cap plate and crank shaft. Also, because of the inclination of these faces, there will be no difficulty in separating plate 15 from the crank shaft when it is desired to remove the same.

On the exterior surface of the fan wheel 4, preferably formed integrally therewith are fan blades 30, set at such an angle that, when the engine is running, air will be forced by the fan blade against the radiating fins 31 on the exterior surface of the cylinder 2, to thereby assist in cooling the engine. Surrounding and secured to the outer ends of these blades 30 is a rim or ring 32 to prevent the air from being thrown off tangentially from this fan and cause same to be directed against the engine cylinder.

Housed within the fan wheel 4 is the magneto comprising coil 33 and magnet ring 34, the latter having pole pieces 35 secured to the ends thereof. The ends 36 of the core of coil 33 are shaped to fit closely the inner faces of the pole pieces as the fan wheel rotates, but the coil is so mounted that the ends of the core do not come in contact with these pole pieces.

Integral with or rigidly secured to the bearing 18, is a cap plate 37 for the open end of the crank case. Between this cap plate and the crank case is a gasket designed to furnish a tight joint between the two when the plate is drawn up tightly against the crank case. Mounted upon the bearing member 18, adjustably, but capable of being secured rigidly thereto by means of hub 38, is a plate 39, which, with fan wheel 4, forms a casing for the ignition system. This plate 39, has a hollow projection 40, in which is seated the coil 33 of the ignition system.

The bell crank lever 41, mounted on the pivot 42 and having at one end a weight 43 and near its other end a cam 44, acts both as a centrifugal governor and an actuator for the make and break mechanism 45 connected in series with the spark plug 46.

It is of course understood that the specific description of structure set forth above may be departed from without departing from the spirit of my invention, as set forth in this specification and the appended claims.

Having now described my invention, I claim—

1. In a mechanism of the character disclosed, comprising a crank case, a cap plate therefor, a bearing integral with said cap plate, a shaft in said bearing and having an end thereof extending into the case, a cover plate secured to the other end of the shaft, a fan wheel secured to the cover plate, sealing means between the fan wheel and the bearing, said cover plate enclosing the end of the bearing remote from the case for preventing leakage of lubricating fluid.

2. In an internal combustion engine of the two cycle type, a crank case, a bearing having means for sealing the bearing to the case, a crank shaft in the bearing, said shaft and bearing having means for receiving lubricant from the crank case, a cover plate secured to and having a close fit with said shaft beyond the outer end of said bearing and sealing means between said plate and said bearing, whereby escape of lubricant and pressure is prevented.

3. In an internal combustion engine of the two cycle type, a crank case, a bearing rigid therewith, a crank shaft rotatable in said bearing, means forming a seal chamber about the outer end of said bearing for receiving surplus of lubricant from the bearing and shaft, said means including a detachable drain plate to permit the removal of oil.

4. In an internal combustion engine, a fly wheel, a bearing member on which said fly wheel is rotatable, a shaft rotatable in said bearing member, said shaft having a reduced end portion, partially threaded, the ends of the larger portion adjacent the smaller portion having flat faces arranged at an angle to the axis of the shaft and a cover plate having an aperture provided with faces adapted to co-operate with the faces on the shaft.

5. In internal combustion engine, a fly wheel, a bearing member on which said fly wheel is rotatable, a shaft rotatable in said bearing member, said shaft having a reduced end portion partially threaded, the end of the larger portion adjacent to the smaller portion having flat faces arranged at an angle to the axis of the shaft, a cover plate having an aperture provided with faces adapted to co-operate with the faces on the shaft, and means for drawing the cover plate faces tightly against the shaft faces to prevent relative rotary movement between the parts and yet permit easy separation thereof.

6. In a machine of the class described, a crank shaft, a bearing member in which said shaft rotates, the exterior surface of said bearing member having a bearing surface formed thereon, a fan wheel journalled on said bearing surface, and means for preventing escape of oil from the mechanism including a cover plate tightly secured to the shaft and fan wheel and a gasket around the bearing member against which the fan wheel is tightly pressed.

7. In a machine of the character described, an engine crank shaft, a bearing therefor, a fan wheel rotatable on the bearing, and a cover plate surrounding the crank shaft and enclosing the end of the bearing away from the crank case, said plate being secured to said shaft and fan wheel to prevent relative rotation thereof.

In witness whereof, I hereunto subscribe my name to this specification.

HOWARD F. SNYDER.